United States Patent
Nagai et al.

(10) Patent No.: US 6,933,411 B2
(45) Date of Patent: Aug. 23, 2005

(54) AROMATIC DIAMINE AND POLYIMIDE THEREOF

(75) Inventors: Naoshi Nagai, Sodegaura (JP); Masaru Kawaguchi, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/718,532

(22) Filed: Nov. 24, 2003

(65) Prior Publication Data

US 2004/0082754 A1 Apr. 29, 2004

Related U.S. Application Data

(62) Division of application No. 10/232,744, filed on Sep. 3, 2002, now Pat. No. 6,737,503.

(30) Foreign Application Priority Data

Sep. 4, 2001 (JP) .................................. 2001-267218
Oct. 30, 2001 (JP) .................................. 2001-332664

(51) Int. Cl.$^7$ ............................................. C07C 217/90
(52) U.S. Cl. ............................................................. 564/430
(58) Field of Search ..................... 564/430; 568/585, 568/586

(56) References Cited

U.S. PATENT DOCUMENTS

| | | | |
|---|---|---|---|
| 4,065,345 A | | 12/1977 | Progar et al. |
| 4,847,349 A | | 7/1989 | Ohta et al. |
| 4,864,008 A | * | 9/1989 | Murata et al. ............. 564/315 |
| 5,003,039 A | * | 3/1991 | Keller ...................... 528/362 |
| 5,004,627 A | | 4/1991 | Presswood et al. |
| 5,278,276 A | | 1/1994 | Ohta et al. |
| 5,420,233 A | | 5/1995 | Isogai et al. |
| 5,644,022 A | | 7/1997 | Jensen |
| 5,734,008 A | | 3/1998 | Shirasaki et al. |
| 5,750,789 A | * | 5/1998 | Hirano et al. ............. 564/428 |

FOREIGN PATENT DOCUMENTS

| | | |
|---|---|---|
| EP | 0 443 352 A2 | 8/1991 |
| EP | 1 193 280 A1 | 4/2002 |
| JP | 61-143477 A | 7/1986 |
| JP | 06-073338 A | 3/1994 |
| JP | 09-328612 A | 12/1997 |
| JP | 11-322928 A | 11/1999 |

OTHER PUBLICATIONS

Database CAPLUS on STN, Acc. No. 1968:77890, Richardson et al., Industrial & Engineering Chemistry Product Research and Development (1968), 7(1), p. 17–21 (CAPLUS abstract).*

Database CAPLUS on STN, Acc. No. 1995:621619, Matsuo et al., JP 07026018 A2 (Jan. 27, 1995) (CAPLUS abstract).*

* cited by examiner

*Primary Examiner*—Brian Davis
(74) *Attorney, Agent, or Firm*—Buchanan Ingersoll, P.C.

(57) ABSTRACT

The aromatic diamine compound of the present invention is represented by the following formula (1), and from the aromatic diamine compound a polyimide having a repeating unit represented by the following formula (4), which has low-temperature adherability, can be obtained.

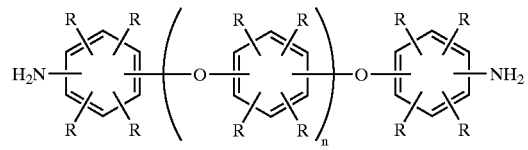

(1)

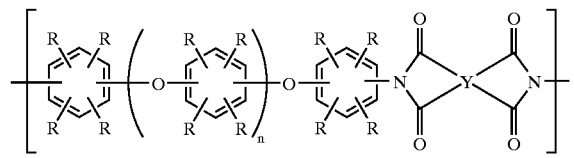

(4)

In the formulas (1) and (4), n is an integer of 3 to 7, each R is independently an atom or a group selected from the group consisting of a hydrogen atom, a halogen atom and a hydrocarbon group, the same or different two hetero atoms selected from nitrogen atoms and oxygen atoms bonded to each benzene ring are at the ortho- or meta-positions to each other on at least one benzene ring, and when n is 3, the hetero atoms are at the ortho- or meta-positions to each other on all the benzene rings. In the formula (4), Y is a tetravalent organic group.

3 Claims, No Drawings

AROMATIC DIAMINE AND POLYIMIDE THEREOF

This application is a division of application Ser. No. 10/232,744 filed Sep. 3, 2002, now U.S. Pat. No. 6,737,503, which claims priority from Japanese Application No. 2001-267218 filed Sep. 4, 2001 and Japanese Application No. 2001-332664 filed Oct. 30, 2001, the contents of which are hereby incorporated by reference.

FIELD OF THE INVENTION

The present invention relates to a novel diamine and its polyimide. More particularly, the invention relates to a novel aromatic diamine and its polyimide which is suitable for low-temperature adhesive bonding.

BACKGROUND OF THE INVENTION

Polyimides are excellent in heat resistance, chemical resistance, mechanical strength, electric properties, etc., and by utilizing these excellent properties, they have been widely used in various technical fields such as aircraft field and electronic field.

As to polyimides for adhesive bonding, heat-resistant adhesive polyimides containing 3,3'-diaminobenzophenone or 1,3-bis(3-aminophenoxy)benzene (abbreviated to APB hereinafter) as a diamine component are disclosed in U.S. Pat. No. 4,065,345 and Japanese Patent Laid-Open Publication No. 143477/1986. Although these polyimides have excellent heat resistance and adhesion properties, they have a problem that their adhesion temperatures need to be set to high temperatures in order to exhibit favorable adhesion.

In Japanese Patent Laid-Open Publication No. 73338/1994 and Japanese Patent Laid-Open Publication No. 322928/1999, polyimides having a siloxane bond or aliphatic units in the polymer as a main chain are disclosed. Although these polyimides have a relatively low glass transition temperature (Tg) advantageous in the adhesion properties, they contain many aliphatic units, whereby not only heat resistance, a feature of polyimide, is lowered but also adhesion properties are deteriorated.

OBJECT OF THE INVENTION

It is an object of the present invention to provide a novel polyimide that exhibits excellent adhesion properties and adhesive strength at an adhesion temperature lower than that of the conventional polyimides.

It is another object of the invention to provide a diamine suitable as a starting material for the preparation of the polyimide.

SUMMARY OF THE INVENTION

The present inventors have earnestly studied to solve the above problems. As a result, they have found that an aromatic diamine can be prepared by allowing an aromatic dihalogen compound such as an aromatic difluoro compound represented by the formula (3) to react with an aminophenol derivative, and also have found a novel aromatic diamine represented by the formula (1) which has various substitution positions.

The present inventors have further found that a polyimide containing the above diamine as a constituent exhibits excellent adhesion properties and adhesive strength at a low adhesion temperature.

That is to say, the present invention relates to:

(1) an aromatic diamine compound represented by the formula (1):

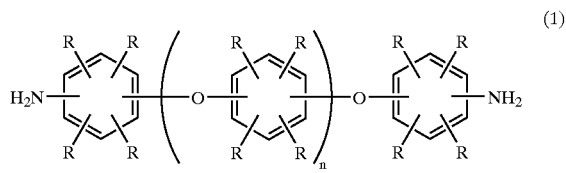

wherein n is an integer of 3 to 7, each R is independently an atom or a group selected from the group consisting of a hydrogen atom, a halogen atom and a hydrocarbon group, the same or different two hetero atoms selected from nitrogen atoms and oxygen atoms bonded to each benzene ring are at the ortho- or meta-positions to each other on at least one benzene ring, and when n is 3, the hetero atoms are at the ortho- or meta-positions to each other on all the benzene rings;

(2) an aromatic difluoro compound represented by the formula (3):

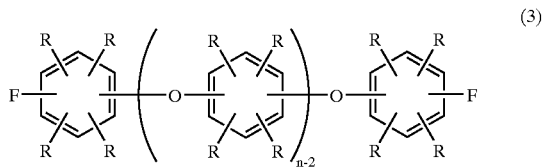

wherein n is an integer of 3 to 7, and each R is independently an atom or a group selected from the group consisting of a hydrogen atom, a halogen atom and a hydrocarbon group; and (3) a polyimide having a repeating unit represented by the formula (4):

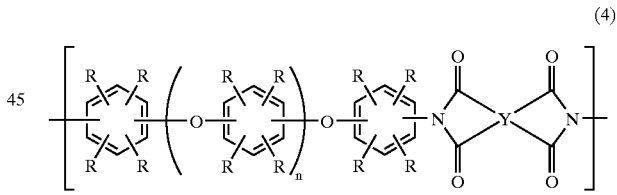

wherein Y is a tetravalent organic group, n is an integer of 3 to 7, each R is independently an atom or a group selected from the group consisting of a hydrogen atom, a halogen atom and a hydrocarbon group, the same or different two hetero atoms selected from nitrogen atoms and oxygen atoms bonded to each benzene ring are at the ortho- or meta-positions to each other on at least one benzene ring, and when n is 3, the hetero atoms are at the ortho- or meta-positions to each other on all the benzene rings.

DETAILED DESCRIPTION OF THE INVENTION

Aromatic Diamine Compound

The aromatic diamine compound of the invention is represented by the following formula (1).

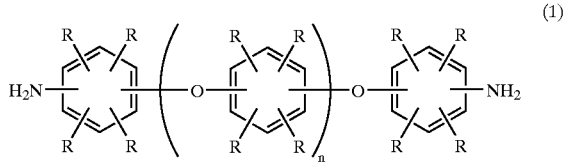

(1)

In the formula (1), n is an integer of 3 to 7, preferably an integer of 3 to 5. Each R is independently an atom or a group selected from the group consisting of a hydrogen atom, a halogen atom and a hydrocarbon group. The same or different two hetero atoms selected from nitrogen atoms and oxygen atoms bonded to each benzene ring are at the ortho- or meta-positions to each other on at least one benzene ring. When n is 3, the hetero atoms are at the ortho- or meta-positions to each other on all the benzene rings.

Examples of the halogen atoms indicated by R in the formula (1) include a fluorine atom, a chlorine atom, a bromine atom and an iodine atom.

Examples of the hydrocarbon groups indicated by R include a lower alkyl group, a lower alkenyl group, an aralkyl group and an aryl group.

The lower alkyl group is a straight-chain, branched or cyclic alkyl group of 1 to 8 carbon atoms, and examples of such alkyl groups include methyl, ethyl, n-propyl, isopropyl, n-butyl, isobutyl, sec-butyl, tert-butyl, n-pentyl, neopentyl, n-hexyl, n-heptyl, n-octyl, cyclopentyl, cyclohexyl, cycloheptyl and cyclooctyl.

The lower alkenyl group is a straight-chain or branched alkenyl group of 2 to 6 carbon atoms, and examples of such alkenyl groups include vinyl, allyl, isopropenyl, 4-pentenyl and 5-hexenyl.

The aralkyl group is an aralkyl group of 7 to 15 carbon atoms, and examples of such aralkyl groups include benzyl, phenethyl, benzhydryl and phenylpropyl.

The aryl group is an aryl group of 6 to 15 carbon atoms, and examples of such aryl groups include phenyl, tolyl, xylyl and naphthyl.

The aromatic diamine compound is preferably one wherein R in the formula (1) is a hydrogen atom. More specifically, an aromatic diamine compound represented by the following formula (7) or (8) is preferable.

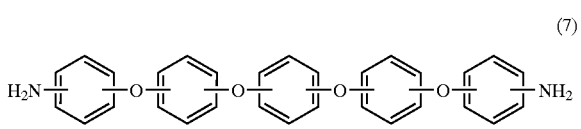

(7)

In the formula (7), the same or different two hetero atoms selected from nitrogen atoms and oxygen atoms bonded to each benzene ring are at the ortho- or meta-positions to each other on all the benzene rings.

In the formula (8), the same or different two hetero atoms selected from nitrogen atoms and oxygen atoms bonded to each benzene ring are at the ortho- or meta-positions to each other on at least one benzene ring.

The compound represented by the formula (1) is also preferably an aromatic diamine compound represented by the formula (2).

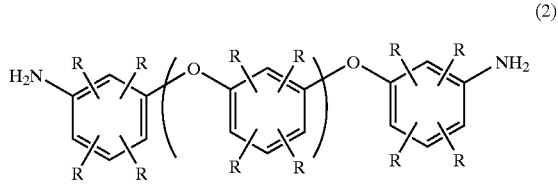

(2)

wherein R and n are as defined in the formula (1).

Examples of the aromatic diamine compounds represented by the formula (1) are given below.

That is to say, there can be mentioned the following compounds without limiting thereto;
1,3-bis(3-(3-aminophenoxy)phenoxy)benzene,
1,3-bis(3-(2-aminophenoxy)phenoxy)benzene,
1,3-bis(2-(2-aminophenoxy)phenoxy)benzene,
1,3-bis(2-(3-aminophenoxy)phenoxy)benzene,
1,2-bis(3-(3-aminophenoxy)phenoxy)benzene,
1,2-bis(3-(2-aminophenoxy)phenoxy)benzene,
1,2-bis(2-(2-aminophenoxy)phenoxy)benzene,
1,2-bis(2-(3-aminophenoxy)phenoxy)benzene,
1,3-bis(3-(3-aminophenoxy)phenoxy)-2-methylbenzene,
1,3-bis(3-(2-aminophenoxy)phenoxy)-5-sec-butylbenzene,
1,3-bis(2-(2-amino-6-ethylphenoxy)phenoxy)benzene,
1,3-bis(2-(3-aminophenoxy)-4-methylphenoxy)benzene,
1,2-bis(3-(3-aminophenoxy)phenoxy)-4-methylbenzene,
1,2-bis(3-(2-amino-3-propylphenoxy)phenoxy)benzene,
1,3-bis(3-(3-aminophenoxy)phenoxy)-2-chlorobenzene,
1,3-bis(3-(2-aminophenoxy)phenoxy)-5-bromobenzene,
1,3-bis(2-(2-amino-6-chlorophenoxy)phenoxy)benzene,
bis(3-(3-(3-aminophenoxy)phenoxy)phenyl)ether,
bis(3-(3-(2-aminophenoxy)phenoxy)phenyl)ether,
bis(3-(3-(4-aminophenoxy)phenoxy)phenyl)ether,
bis(4-(3-(3-aminophenoxy)phenoxy)phenyl)ether,
bis(2-(3-(3-aminophenoxy)phenoxy)phenyl)ether,
bis(4-(3-(2-aminophenoxy)phenoxy)phenyl)ether,
bis(4-(2-(2-aminophenoxy)phenoxy)phenyl)ether,
bis(2-(2-(3-aminophenoxy)phenoxy)phenyl)ether,
bis(2-(4-(3-aminophenoxy)phenoxy)phenyl)ether,
bis(2-(2-(4-aminophenoxy)phenoxy)phenyl)ether,
bis(2-(2-(2-aminophenoxy)phenoxy)phenyl)ether,
bis(2-(4-(2-aminophenoxy)phenoxy)phenyl)ether,
bis(4-(2-(3-aminophenoxy)phenoxy)phenyl)ether,
bis(3-(3-(3-aminophenoxy)phenoxy)-4-methylphenyl) ether,
bis(3-(3-(3-aminophenoxy)phenoxy)-2-ethylphenyl) ether,
bis(3-(3-(3-aminophenoxy)phenoxy)-5-sec-butylphenyl) ether,
bis(4-(3-(3-aminophenoxy)phenoxy)-2,5-dimethylphenyl)ether,

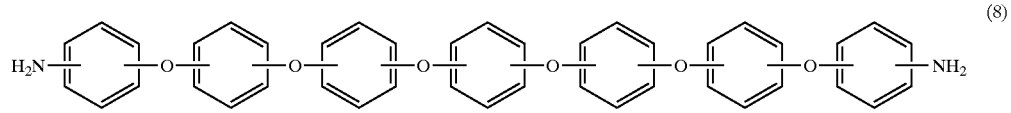

(8)

bis(2-(2-(2-amino-6-ethylphenoxy)phenoxy)phenyl) ether,
bis(2-(4-(3-aminophenoxy)phenoxy)-4-methylphenyl) ether,
bis(2-(3-(4-aminophenoxy)phenoxy)-4-tert-butylphenyl) ether,
bis(3-(3-(3-aminophenoxy)phenoxy)-2,5-di-tert-butylphenyl)ether,
bis(4-(4-(2-aminophenoxy)phenoxy)-3-n-butylphenyl) ether,
bis(3-(2-(2-amino-3-propylphenoxy)phenyl)ether,
bis(3-(3-(3-aminophenoxy)phenoxy)-2-chlorophenyl) ether,
bis(3-(3-(3-aminophenoxy)phenoxy)-5-bromophenyl) ether,
1,3-bis(3-(3-(3-aminophenoxy)phenoxy)phenoxy) benzene,
1,3-bis(3-(3-(4-aminophenoxy)phenoxy)phenoxy) benzene,
1,3-bis(4-(3-(3-aminophenoxy)phenoxy)phenoxy) benzene,
1,3-bis(2-(3-(3-aminophenoxy)phenoxy)phenoxy) benzene,
1,3-bis(4-(2-(2-aminophenoxy)phenoxy)phenoxy) benzene,
1,3-bis(2-(2-(3-aminophenoxy)phenoxy)phenoxy) benzene,
1,3-bis(2-(4-(3-aminophenoxy)phenoxy)phenoxy) benzene,
1,3-bis(2-(2-(4-aminophenoxy)phenoxy)phenoxy) benzene,
1,4-bis(3-(3-(3-aminophenoxy)phenoxy)phenoxy) benzene,
1,4-bis(3-(3-(4-aminophenoxy)phenoxy)phenoxy) benzene,
1,4-bis(3-(2-(2-aminophenoxy)phenoxy)phenoxy) benzene,
1,4-bis(4-(3-(3-aminophenoxy)phenoxy)phenoxy) benzene,
1,4-bis(4-(2-(3-aminophenoxy)phenoxy)phenoxy) benzene,
1,4-bis(2-(2-(3-aminophenoxy)phenoxy)phenoxy) benzene,
1,4-bis(2-(4-(2-aminophenoxy)phenoxy)phenoxy) benzene,
1,4-bis(4-(2-(2-aminophenoxy)phenoxy)phenoxy) benzene,
1,4-bis(2-(3-(3-aminophenoxy)phenoxy)phenoxy) benzene,
1,2-bis(3-(3-(3-aminophenoxy)phenoxy)phenoxy) benzene,
1,2-bis(3-(2-(3-aminophenoxy)phenoxy)phenoxy) benzene,
1,2-bis(3-(4-(3-aminophenoxy)phenoxy)phenoxy) benzene,
1,2-bis(4-(4-(3-aminophenoxy)phenoxy)phenoxy) benzene,
1,2-bis(4-(4-(4-aminophenoxy)phenoxy)phenoxy) benzene,
1,2-bis(2-(4-(2-aminophenoxy)phenoxy)phenoxy) benzene,
1,2-bis(2-(2-(2-aminophenoxy)phenoxy)phenoxy) benzene,
1,2-bis(2-(3-(3-aminophenoxy)phenoxy)phenoxy) benzene,
1,2-bis(2-(4-(4-aminophenoxy)phenoxy)phenoxy) benzene,
1,3-bis(3-(3-(3-aminophenoxy)phenoxy)phenoxy)-2-methylbenzene,
1,3-bis(3-(3-(3-aminophenoxy)phenoxy)phenoxy)-4-methylbenzene,
1,3-bis(3-(3-(3-aminophenoxy)phenoxy)phenoxy)-2-ethylbenzene,
1,3-bis(3-(3-(3-aminophenoxy)phenoxy)phenoxy)-5-sec-butylbenzene,
1,3-bis(4-(3-(3-aminophenoxy)phenoxy)phenoxy)-2,5-dimethylbenzene,
1,3-bis(4-(2-(3-aminophenoxy)phenoxy)phenoxy) benzene,
1,3-bis(2-(2-(2-amino-6-ethylphenoxy)phenoxy) phenoxy)benzene,
1,3-bis(2-(4-(3-aminophenoxy)phenoxy)-4-methylphenoxy)benzene,
1,3-bis(2-(3-(4-aminophenoxy)phenoxy)-4-tert-butylphenoxy)benzene,
1,4-bis(3-(3-(3-aminophenoxy)phenoxy)phenoxy)-2,5-di-tert-butylbenzene,
1,4-bis(3-(3-(3-aminophenoxy)phenoxy)phenoxy)-2,3-dimethylbenzene,
1,2-bis(3-(3-(3-aminophenoxy)phenoxy)phenoxy)-4-methylbenzene,
1,2-bis(3-(4-(2-aminophenoxy)phenoxy)phenoxy)-3-n-butylbenzene,
1,2-bis(3-(2-(2-amino-3-propylphenoxy)phenoxy) phenoxy)benzene,
bis(3-(3-(3-(3-aminophenoxy)phenoxy)phenoxy)phenyl) ether,
bis(3-(3-(3-(4-aminophenoxy)phenoxy)phenoxy)phenyl) ether,
bis(3-(4-(3-(3-aminophenoxy)phenoxy)phenoxy)phenyl) ether,
bis(3-(4-(2-(2-aminophenoxy)phenoxy)phenoxy)phenyl) ether,
bis(3-(2-(3-(3-aminophenoxy)phenoxy)phenoxy)phenyl) ether,
bis(3-(2-(4-(4-aminophenoxy)phenoxy)phenoxy)phenyl) ether,
bis(3-(2-(2-(3-aminophenoxy)phenoxy)phenoxy)phenyl) ether,
bis(3-(2-(4-(3-aminophenoxy)phenoxy)phenoxy)phenyl) ether,
bis(3-(2-(2-(2-aminophenoxy)phenoxy)phenoxy)phenyl) ether,
bis(3-(2-(2-(4-aminophenoxy)phenoxy)phenoxy)phenyl) ether,
bis(4-(3-(3-(3-aminophenoxy)phenoxy)phenoxy)phenyl) ether,
bis(4-(3-(3-(4-aminophenoxy)phenoxy)phenoxy)phenyl) ether,
bis(4-(3-(2-(2-aminophenoxy)phenoxy)phenoxy)phenyl) ether,
bis(4-(4-(3-(3-aminophenoxy)phenoxy)phenoxy)phenyl) ether,
bis(4-(4-(2-(3-aminophenoxy)phenoxy)phenoxy)phenyl) ether,
bis(4-(4-(2-(2-aminophenoxy)phenoxy)phenoxy)phenyl) ether,
bis(4-(2-(2-(2-aminophenoxy)phenoxy)phenoxy)phenyl) ether,
bis(4-(2-(4-(2-aminophenoxy)phenoxy)phenoxy)phenyl) ether,
bis(4-(2-(3-(3-aminophenoxy)phenoxy)phenoxy)phenyl) ether,
bis(2-(3-(3-(3-aminophenoxy)phenoxy)phenoxy)phenyl) ether, bis(2-(3-(2-(3-aminophenoxy)phenoxy)phenoxy)phenyl) ether,
bis(2-(3-(2-(2-aminophenoxy)phenoxy)phenoxy)phenyl) ether,
bis(2-(3-(4-(3-aminophenoxy)phenoxy)phenoxy)phenyl) ether,
bis(2-(3-(4-(2-aminophenoxy)phenoxy)phenoxy)phenyl) ether,
bis(2-(4-(4-(3-aminophenoxy)phenoxy)phenoxy)phenyl) ether,
bis(2-(4-(4-(4-aminophenoxy)phenoxy)phenoxy)phenyl) ether,
bis(2-(2-(4-(2-aminophenoxy)phenoxy)phenoxy)phenyl) ether,
bis(2-(2-(2-(2-aminophenoxy)phenoxy)phenoxy)phenyl) ether,
bis(2-(2-(3-(3-aminophenoxy)phenoxy)phenoxy)phenyl) ether,
bis(2-(2-(4-(4-aminophenoxy)phenoxy)phenoxy)phenyl) ether,
1,3-bis(3-(3-(3-(3-aminophenoxy)phenoxy)phenoxy) phenoxy)benzene,
1,3-bis(3-(3-(4-(3-aminophenoxy)phenoxy)phenoxy) phenoxy)benzene,
1,3-bis(4-(3-(3-(3-aminophenoxy)phenoxy)phenoxy) phenoxy)benzene,
1,3-bis(4-(2-(2-(3-aminophenoxy)phenoxy)phenoxy) phenoxy)benzene,
1,3-bis(2-(3-(3-(3-aminophenoxy)phenoxy)phenoxy) phenoxy)benzene,
1,3-bis(2-(3-(4-(3-aminophenoxy)phenoxy)phenoxy) phenoxy)benzene,
1,3-bis(2-(2-(3-(3-aminophenoxy)phenoxy)phenoxy) phenoxy)benzene,
1,3-bis(2-(4-(3-(2-aminophenoxy)phenoxy)phenoxy) phenoxy)benzene,
1,3-bis(2-(2-(2-(2-aminophenoxy)phenoxy)phenoxy) phenoxy)benzene,
1,3-bis(2-(2-(4-(3-aminophenoxy)phenoxy)phenoxy) phenoxy)benzene,
1,4-bis(3-(3-(3-(3-aminophenoxy)phenoxy)phenoxy) phenoxy)benzene,
1,4-bis(3-(3-(4-(3-aminophenoxy)phenoxy)phenoxy) phenoxy)benzene,
1,4-bis(3-(2-(2-(3-aminophenoxy)phenoxy)phenoxy) phenoxy)benzene,
1,4-bis(4-(3-(3-(3-aminophenoxy)phenoxy)phenoxy) phenoxy)benzene,
1,4-bis(4-(2-(3-(3-aminophenoxy)phenoxy)phenoxy) phenoxy)benzene,
1,4-bis(4-(2-(2-(3-aminophenoxy)phenoxy)phenoxy) phenoxy)benzene,
1,4-bis(2-(2-(2-(3-aminophenoxy)phenoxy)phenoxy) phenoxy)benzene,
1,4-bis(2-(4-(2-(3-aminophenoxy)phenoxy)phenoxy) phenoxy)benzene,
1,4-bis(2-(3-(3-(2-aminophenoxy)phenoxy)phenoxy) phenoxy)benzene,
1,2-bis(3-(3-(3-(3-aminophenoxy)phenoxy)phenoxy) phenoxy)benzene,
1,2-bis(3-(2-(3-(3-aminophenoxy)phenoxy)phenoxy) phenoxy)benzene,
1,2-bis(3-(2-(2-(3-aminophenoxy)phenoxy)phenoxy) phenoxy)benzene,
1,2-bis(3-(4-(3-(3-aminophenoxy)phenoxy)phenoxy) phenoxy)benzene,
1,2-bis(3-(4-(2-(3-aminophenoxy)phenoxy)phenoxy) phenoxy)benzene,
1,2-bis(4-(4-(3-(2-aminophenoxy)phenoxy)phenoxy) phenoxy)benzene,
1,2-bis(4-(4-(4-(3-aminophenoxy)phenoxy)phenoxy) phenoxy)benzene,
1,2-bis(2-(4-(2-(3-aminophenoxy)phenoxy)phenoxy) phenoxy)benzene,
1,2-bis(2-(2-(2-(3-aminophenoxy)phenoxy)phenoxy) phenoxy)benzene,
1,2-bis(2-(3-(3-(2-aminophenoxy)phenoxy)phenoxy) phenoxy)benzene, and
1,2-bis(2-(4-(4-(3aminophenoxy)phenoxy)phenoxy) phenoxy)benzene.

Of the above compounds, preferable are 1,3-bis(3-(3-aminophenoxy)phenoxy)benzene represented by the formula (9) and 1,3-bis(3-(3-(3-aminophenoxy)phenoxy) phenoxy)benzene represented by the formula (10).

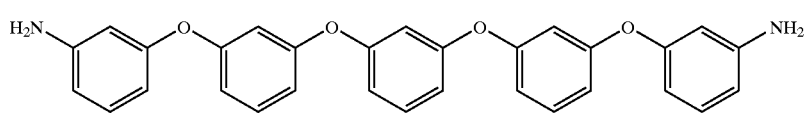

(9)

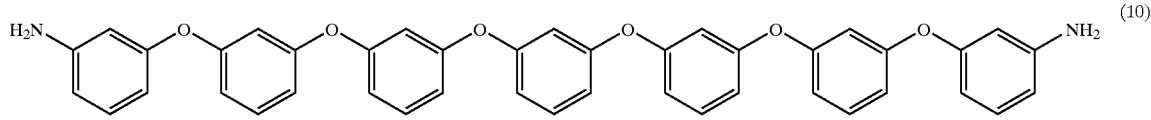

(10)

Aromatic Difluoro Compound

The aromatic difluoro compound that is an intermediate material for preparing the aromatic diamine compound is a difluoro compound wherein 3 to 7 benzene rings are linked by ether bonds as represented by the formula (3), and this compound may have any substituent at any substitution position.

Examples of the hydrocarbon groups and the halogen atoms indicated by R in the formula (3) include the same groups and atoms as previously described with respect to the aromatic diamine.

Examples of the aromatic difluoro compounds represented by the formula (3) are given below.

That is to say, there can be mentioned the following compounds without limiting thereto;
1,3-bis(3-fluorophenoxy)benzene,
1,3-bis(2-fluorophenoxy)benzene,
1,3-bis(4-fluorophenoxy)benzene,
1,4-bis(3-fluorophenoxy)benzene,
1,4-bis(4-fluorophenoxy)benzene,
1,4-bis(2-fluorophenoxy)benzene,
1,2-bis(3-fluorophenoxy)benzene, 1,2-bis(4-fluorophenoxy)benzene,
1,2-bis(2-fluorophenoxy)benzene,
1,3-bis(3-fluorophenoxy)-2-methylbenzene,
1,3-bis(2-fluorophenoxy)-4-ethylbenzene,
1,3-bis(4-fluorophenoxy)-4-sec-butylbenzene,
1,4-bis(3-fluoro-2-methylphenoxy)benzene,
1,4-bis(4-fluorophenoxy)-2,3-dimethylbenzene,
1,4-bis(2-fluorophenoxy)-2,5-di-tert-butylbenzene,
1,2-bis(3-fluorophenoxy)-4-n-butylbenzene,
1,2-bis(2-fluoro-5-ethylphenoxy)benzene,
bis(3-(3-fluorophenoxy)phenyl)ether,
bis(3-(2-fluorophenoxy)phenyl)ether,
bis(4-(3-fluorophenoxy)phenyl)ether,
bis(3-(4-fluorophenoxy)phenyl)ether,
bis(2-(3-fluorophenoxy)phenyl)ether,
bis(2-(4-fluorophenoxy)phenyl)ether,
bis(4-(4-fluorophenoxy)phenyl)ether,
bis(2-(2-fluorophenoxy)phenyl)ether,
bis(3-(3-fluorophenoxy)-2-methylphenyl)ether,
bis(3-(3-fluorophenoxy)-4-ethylphenyl)ether,
bis(3-(4-fluorophenoxy)-4-sec-butylphenyl)ether,
bis(3-(3-fluoro-2-methylphenoxy)phenyl)ether,
bis(4-(3-fluorophenoxy)-2,3-dimethylphenyl)ether,
bis(2-(3-fluorophenoxy)-2,5-di-tert-butylphenyl)ether,
bis(3-(3-fluorophenoxy)-4-n-butylphenyl)ether,
bis(2-(2-fluoro-5-ethylphenoxy)phenyl)ether,
1,3-bis(3-(3-fluorophenoxy)phenoxy)benzene,
1,3-bis(3-(2-fluorophenoxy)phenoxy)benzene,
1,3-bis(4-(3-fluorophenoxy)phenoxy)benzene,
1,4-bis(3-(3-fluorophenoxy)phenoxy)benzene,
1,4-bis(3-(4-fluorophenoxy)phenoxy)benzene,
1,4-bis(2-(3-fluorophenoxy)phenoxy)benzene,
1,2-bis(2-(4-fluorophenoxy)phenoxy)benzene,
1,2-bis(4-(3-fluorophenoxy)phenoxy)benzene,
1,2-bis(2-(3-fluorophenoxy)phenoxy)benzene,
1,3-bis(3-(3-fluorophenoxy)phenoxy)-2-methylbenzene,
1,3-bis(3-(3-fluorophenoxy)phenoxy)-4-ethylbenzene,
1,3-bis(4-(3-fluorophenoxy)phenoxy)-4-sec-butylbenzene,
1,4-bis(3-(3-fluoro-2-methylphenoxy)phenoxy)benzene,
1,4-bis(4-(3-fluorophenoxy)phenoxy)-2,3-dimethylbenzene,
1,4-bis(2-(3-fluorophenoxy)phenoxy)-2,5-di-tert-butylbenzene,
1,2-bis(3-(3-fluorophenoxy)phenoxy)-4-n-butylbenzene,
1,2-bis(2-(2-fluoro-5-ethylphenoxy)phenoxy)benzene
bis(3-(3-(3-fluorophenoxy)phenoxy)phenyl)ether,
bis(3-(3-(2-fluorophenoxy)phenoxy)phenyl)ether,
bis(3-(3-(4-fluorophenoxy)phenoxy)phenyl)ether,
bis(4-(3-(3-fluorophenoxy)phenoxy)phenyl)ether,
bis(2-(3-(3-fluorophenoxy)phenoxy)phenyl)ether,
bis(4-(3-(2-fluorophenoxy)phenoxy)phenyl)ether,
bis(4-(2-(2-fluorophenoxy)phenoxy)phenyl)ether,
bis(2-(2-(3-fluorophenoxy)phenoxy)phenyl)ether,
bis(2-(4-(3-fluorophenoxy)phenoxy)phenyl)ether,
bis(2-(2-(4-fluorophenoxy)phenoxy)phenyl)ether,
bis(2-(2-(2-fluorophenoxy)phenoxy)phenyl)ether,
bis(2-(4-(2-fluorophenoxy)phenoxy)phenyl)ether,
bis(4-(2-(3-fluorophenoxy)phenoxy)phenyl)ether,
bis(3-(3-(3-fluorophenoxy)phenoxy)-4-methylphenyl)ether,
bis(3-(3-(3-fluorophenoxy)phenoxy)-2-ethylphenyl)ether,
bis(3-(3-(3-fluorophenoxy)phenoxy)-5-sec-butylphenyl)ether,
bis(4-(3-(3-fluorophenoxy)phenoxy)-2,5dimethylphenyl)ether,
bis(2-(2-(2-fluoro-6-ethylphenoxy)phenoxy)phenyl)ether,
bis(2-(4-(3-fluorophenoxy)phenoxy)-4-methylphenyl)ether,
bis(2-(3-(4-fluorophenoxy)phenoxy)-4-tert-butylphenyl)ether,
bis(3-(3-(3-fluorophenoxy)phenoxy)-2,5-di-tert-butylphenyl)ether,
bis(4-(4-(2-fluorophenoxy)phenoxy)-3-n-butylphenyl)ether,
bis(3-(2-(2-fluoro-3-propylphenoxy)phenyl)ether,
1,3-bis(3-(3-(3-fluorophenoxy)phenoxy)phenoxy)benzene,
1,3-bis(3-(3-(4-fluorophenoxy)phenoxy)phenoxy)benzene,
1,3-bis(4-(3-(3-fluorophenoxy)phenoxy)phenoxy)benzene,
1,3-bis(2-(3-(3-fluorophenoxy)phenoxy)phenoxy)benzene,
1,3-bis(4-(2-(2-fluorophenoxy)phenoxy)phenoxy)benzene,
1,3-bis(2-(2-(3-fluorophenoxy)phenoxy)phenoxy)benzene,
1,3-bis(2-(4-(3-fluorophenoxy)phenoxy)phenoxy)benzene,
1,3-bis(2-(2-(4-fluorophenoxy)phenoxy)phenoxy)benzene,
1,4-bis(3-(3-(3-fluorophenoxy)phenoxy)phenoxy)benzene,
1,4-bis(3-(3-(4-fluorophenoxy)phenoxy)phenoxy)benzene,
1,4-bis(3-(2-(2-fluorophenoxy)phenoxy)phenoxy)benzene,
1,4-bis(4-(3-(3-fluorophenoxy)phenoxy)phenoxy)benzene,
1,4-bis(4-(2-(3-fluorophenoxy)phenoxy)phenoxy)benzene,
1,4-bis(2-(2-(2-fluorophenoxy)phenoxy)phenoxy)benzene,
1,4-bis(2-(4-(2-fluorophenoxy)phenoxy)phenoxy)benzene,
1,4-bis(4-(2-(2-fluorophenoxy)phenoxy)phenoxy)benzene,
1,4-bis(2-(3-(3-fluorophenoxy)phenoxy)phenoxy)benzene,
1,2-bis(3-(3-(3-fluorophenoxy)phenoxy)phenoxy)benzene,
1,2-bis(3-(2-(3-fluorophenoxy)phenoxy)phenoxy)benzene,
1,2-bis(3-(4-(3-fluorophenoxy)phenoxy)phenoxy)benzene, 1,2-bis(4-(4-(3-fluorophenoxy)phenoxy)phenoxy)benzene, 1,2-bis(4-(4-(4-fluorophenoxy)phenoxy)phenoxy)benzene, 1,2-bis(2-(4-(2-fluorophenoxy)phenoxy)phenoxy)benzene, 1,2-bis(2-(2-(2-fluorophenoxy)phenoxy)phenoxy)benzene, 1,2-bis(2-(3-(3-fluorophenoxy)phenoxy)phenoxy)benzene, 1,2-bis(2-(4-(4-fluorophenoxy)phenoxy)phenoxy)benzene, 1,3-bis(3-(3-(3-fluorophenoxy)phenoxy)phenoxy)-2-methylbenzene 1,3-bis(3-(3-(3-fluorophenoxy)phenoxy)phenoxy)-4-methylbenzene, 1,3-bis(3-(3-(3-fluorophenoxy)phenoxy)phenoxy)-2-ethylbenzene, 1,3-bis(3-(3-(3-fluorophenoxy)phenoxy)phenoxy)-5-sec-butylbenzene, 1,3-bis(4-(3-(3-fluorophenoxy)phenoxy)phenoxy)-2,5-dimethylenzene, 1,3-bis(4-(2-(3-fluorophenoxy)phenoxy)phenoxy)benzene, 1,3-bis(2-(2-(2-fluoro-6-ethylphenoxy)phenoxy)phenoxy)benzene, 1,3-bis(2-(4-(3-fluorophenoxy)phenoxy)-4-methylphenoxy)benzene, 1,3-bis(2-(3-(4-fluorophenoxy)phenoxy)-4-tert-butylphenoxy)benzene, 1,4-bis(3-(3-(3-fluorophenoxy)phenoxy)phenoxy)-2,5-di-tert-butylbenzene, 1,4-bis(3-(3-(3-fluorophenoxy)phenoxy)phenoxy)-2,3-dimethyibenzene, 1,2-bis(3-(3-(3-fluorophenoxy)phenoxy)phenoxy)-4-methylbenzene, 1,2-bis(3-(4-(2-fluorophenoxy)phenoxy)phenoxy)-3-n-butylbenzene, and 1,2-bis(3-(2-(2-fluoro-3-propylphenoxy)phenoxy)phenoxy)benzene.

Process for Preparing Aromatic Diamine Compound

The aromatic diamine compound represented by the formula (1) can be synthesized by allowing an aromatic dihalogen compound represented by the formula (11) to react with an aminophenol derivative represented by the formula (12).

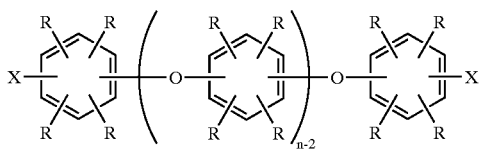
(11)

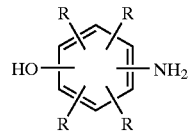
(12)

wherein X is a halogen atom, and R and n are as previously described.

The reaction proceeds stepwise. First, one molecule of aminophenol derivative reacts with the aromatic dihalogen compound to form an aromatic aminohalogen compound represented by the formula (13), and then the resultant compound reacts with another molecule of aminophenol derivative to form the aromatic diamine compound represented by the formula (1).

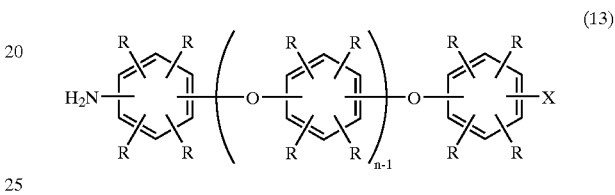
(13)

wherein R, n and X are as previously described.

The reaction can be carried out in, for example, the following manner.

The aminophenol derivative and the aromatic dihalogen compound are mixed with a solvent, and they are heated under reflux in the presence of a basic compound. An alkali metal salt or an alkaline earth metal salt of the aminophenol derivative previously prepared may be used as a starting material. Such alkali metal salt or such alkaline earth metal salt of the aminophenol derivative can be readily prepared by, for example, allowing the corresponding aminophenol derivative to react with a hydroxide, a carbonate, a hydrogencarbonate or a hydride of an alkali metal or an alkaline earth metal to form a salt.

The aminophenol derivative or the salt is used in an amount of 2 to 20 times by mole, preferably 2.1 to 10 times by mole, as much as the aromatic dihalogen compound. It is preferable to carry out the reaction in an atmosphere of inert gas such as nitrogen.

The basic compound used for the reaction is not specifically restricted, provided that the compound captures hydrogen halide and gives no influence on the reaction. Examples of such basic compounds include hydroxides, hydrides, carbonates and hydrogencarbonates of alkali metals such as lithium, sodium and potassium; hydroxides, hydrides, carbonates and hydrogencarbonates of alkaline earth metals such as magnesium and calcium; alkali metals and alkaline earth metals themselves, such as lithium, sodium, potassium, magnesium and calcium; alkali metal alkoxylates, such as sodium methylate, sodium ethylate and t-butoxypotassium; alkali metal weak acid salts, such as sodium acetate, sodium monohydrogenphosphate and potassium monohydrogenphosphate; organic bases, such as pyridine, 4-dimethylaminopyridine and triethylamine; and weakly basic ion exchange resins, such as Amberlyst-21 (trademark) and Amberlyst-93 (trademark). However, the present invention is not limited to these exemplified compounds.

These basic compounds may be used singly or as a mixture of two or more kinds. The basic compound is used in an amount of usually 0.5 to 20 times by mole, preferably 0.8 to 10 times by mole, as much as the aminophenol derivative.

In order to promote the reaction, a catalyst can be added, and examples of such catalysts include copper, copper(I) chloride, copper(II) chloride, copper(I) bromide, copper(II) bromide, copper(I) iodide, copper(II) iodide, copper oxide, copper sulfate and potassium fluoride, without limiting thereto. The catalyst may be selected in consideration of a possible combination of the catalyst with the starting materials.

The above catalysts may be used singly or in combination of two or more kinds.

The catalyst is used in an amount of usually 0.01 to 1 time by mole, preferably 0.02 to 0.5 time by mole, as much as the aromatic dihalogen compound.

The solvent used for the reaction is not specifically restricted, provided that the solvent is unreactive to the reaction substrate, the reaction agent or the reaction product. Preferred examples of the solvents include nitrites, such as acetonitrile; hydrocarbons, such as hexane, toluene and xylene; glycols, such as glyme and diglyme; amides, such as N,N-dimethylformamide and N,N-dimethylacetamide; dimethylsulfoxide, dimethyl sulfone, sulfolane, 1-methyl-2-pyrrolidinone and 1,3-dimethyl-2-imidazolidinone; and ethers, such as tetrahydrofuran and 1,4-dioxane.

These solvents are used singly or as a mixture.

The amount of the solvent used is not specifically restricted, but from the viewpoints of reaction efficiency and ease of handling, it is in the range of 0.5 to 50 times by weight, preferably 0.8 to 30 times by weight, as much as the aromatic dihalogen compound that is a starting material.

Although the reaction temperature depends upon the reaction solvent and the reactivity of the starting materials, it is in the range of usually 0 to 350° C., preferably 10 to 300° C., more preferably 50 to 220° C.

The reaction may be carried out at atmospheric pressure or under pressure, and such pressure is selected according to the solvent used and the reaction temperature. The reaction pressure is usually in the range of about 0.1 to 10 MPa. The reaction temperature occasionally becomes higher than the boiling point of the solvent depending upon the starting materials and the solvent, and in this case, the reaction needs to be performed under pressure using an autoclave.

After the reaction is completed, the reaction mixture is extracted with an organic solvent, and then the solvent is distilled off to obtain a concentrate. It is preferable to purify the concentrate by recrystallization, a method comprising forming a hydrochloric acid salt, recrystallizing the salt and neutralizing the salt, or column chromatography.

Process for Preparing Aromatic Difluoro Compound or Aromatic Dihalogen Compound

The aromatic difluoro compound represented by the formula (3) or the aromatic dihalogen compound represented by the formula (11) can be obtained by allowing benzene dihalide represented by the formula (14) to react with either phenol halide represented by the formula (15) or dihydroxybenzene represented by the formula (16) in the presence of a basic compound.

Of the aromatic difluoro compounds represented by the formula (3) and the aromatic dihalogen compounds represented by the formula (11), a compound wherein n is 3 (compound of the formula (17)) can be obtained by the reaction of dihydroxybenzene represented by the formula (16) with not less than 2 equivalents of benzene dihalide represented by the formula (14).

Of the aromatic difluoro compounds represented by the formula (3) and the aromatic dihalogen compounds represented by the formula (11), a compound wherein n is 4 can be obtained by the reaction of a tricyclic aromatic dihalogen compound represented by the formula (17) with phenol halide represented by the formula (15), and also a compound wherein n is 5 can be obtained by the reaction of a tricyclic aromatic dihalogen compound represented by the formula (17) with bicyclic phenol halide represented by the formula (18).

The bicyclic phenol halide represented by the formula (18) can be obtained by the reaction of benzene dihalide represented by the formula (14) with dihydroxybenzene represented by the formula (16).

Of the aromatic difluoro compounds represented by the formula (3) and the aromatic dihalogen compounds represented by the formula (11), a compound wherein n is 6 can be obtained by the reaction of a compound wherein n in the formula (3) or (11) is 5 with phenol halide represented by the formula (15), and a compound wherein n is 7 can be obtained by the reaction of a compound wherein n in the formula (3) or (11) is 5 with bicyclic phenol halide represented by the formula (18).

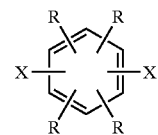

(14)

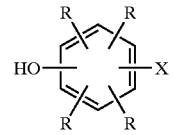

(15)

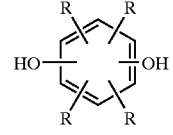

(16)

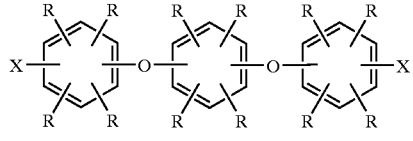

(17)

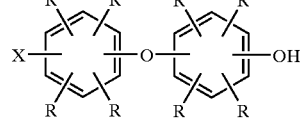

(18)

In the formulas (14) to (18), R and X are as previously described.

The reaction can be carried out in, for example, the following manner.

The benzene dihalide represented by the formula (14) and the phenol halide represented by the formula (15) or the dihydroxybenzene represented by the formula (16) are mixed with a solvent, and they are heated under reflux in the presence of a basic compound. An alkali metal salt or an alkaline earth metal salt of the phenol halide or the dihydroxybenzene previously prepared may be used as a starting material. The alkali metal salt or the alkaline earth metal salt of the phenol halide or the dihydroxybenzene can be readily prepared by, for example, allowing the corresponding phenol halide or dihydroxybenzene to react with a hydroxide, a carbonate, a hydrogencarbonate or a hydride of an alkali metal or an alkaline earth metal to form a salt.

The benzene dihalide is used in an amount of 0.5 to 30 times by mole, preferably 1 to 20 times by mole, more preferably 2 to 15 times by mole, as much as the phenol halide or the dihydroxybenzene.

As the basic compound, the aforesaid basic compounds are employable. Those basic compounds may be used singly or as a mixture of two or more kinds. The amount of the basic compound used is not less than one equivalent based on the benzene dihalide.

The solvent used for the reaction is not specifically restricted, provided that the solvent is unreactive to the reaction substrate, the reaction agent or the reaction product. Preferred examples of the solvents include nitrites, such as acetonitrile; hydrocarbons, such as hexane, toluene and xylene; glycols, such as glyme and diglyme; amides, such as N,N-dimethylformamide and N,N-dimethylacetamide; dimethylsulfoxide, dimethyl sulfone, sulfolane, 1-methyl-2-pyrrolidinone and 1,3-dimethyl-2-imidazolidinone; and ethers, such as tetrahydrofuran and 1,4-dioxane. These solvents are used singly or as a mixture.

The amount of the solvent used is not specifically restricted, but from the viewpoints of reaction efficiency and ease of handling, it is in the range of 0.5 to 50 times by weight, preferably 0.8 to 30 times by weight, as much as the phenol halide or the dihydroxybenzene that is a starting material.

Although the reaction temperature depends upon the reaction solvent and the reactivity of the starting materials, it is in the range of usually 0 to 350° C., preferably 10 to 300° C., more preferably 50 to 220° C.

The reaction may be carried out at atmospheric pressure or under pressure, and such pressure is selected according to the solvent used and the reaction temperature. The reaction pressure is usually in the range of about 0.1 to 10 MPa. The reaction temperature occasionally becomes higher than the boiling point of the solvent depending upon the starting materials and the solvent, and in this case, the reaction needs to be carried out under pressure using an autoclave.

Although the end point of the reaction can be confirmed by chromatography or the like, the reaction time is usually in the range of 0.1 to 100 hours.

After the reaction is completed, the reaction mixture is extracted with an organic solvent, and then the solvent is distilled off to obtain a concentrate. It is preferable to purify the concentrate by recrystallization, distillation, column chromatography or the like.

Polyimide

The polyimide of the invention is described in detail hereinafter.

The polyimide of the invention is a polyimide having a repeating unit represented by the formula (4).

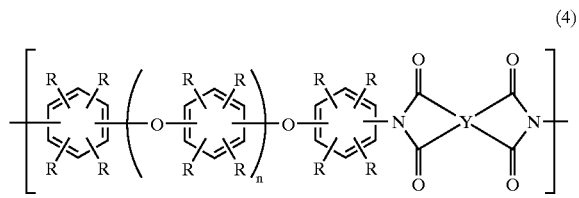

(4)

In the formula (4), n is an integer of 3 to 7, preferably an integer of 3 to 5. Y is a tetravalent organic group, and each R is independently an atom or a group selected from the group consisting of a hydrogen atom, a halogen atom and a hydrocarbon group.

Examples of the hydrocarbon groups and the halogen atoms indicated by R in the formula (4) include the same groups and atoms as previously described with respect to the aromatic diamine.

As to the repeating unit represented by the formula (4), a repeating unit wherein R is a hydrogen atom, that is, a repeating unit represented by the formula (5) is preferable.

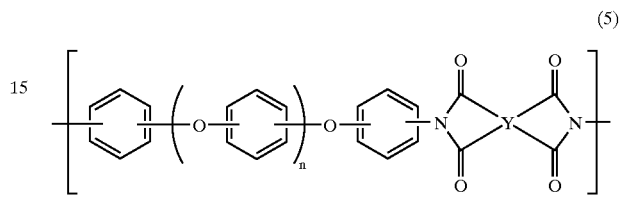

(5)

In the formula (5), n is defined as described above.

In the formulas (4) and (5), the same or different two hetero atoms selected from nitrogen atoms and oxygen atoms bonded to each benzene ring are at the ortho- or meta-positions to each other on at least one benzene ring. However, when n is 3, the hetero atoms are at the ortho- or meta-positions to each other on all the benzene rings.

As the repeating unit represented by the formula (4), a repeating unit wherein said hetero atoms are at the meta-positions to each other, that is, a repeating unit represented by the formula (6) is also preferable.

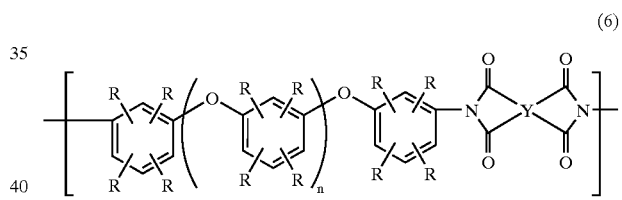

(6)

In the formula (6), each R is independently an atom or a group selected from the group consisting of a hydrogen atom, a halogen atom and a hydrocarbon group, Y is a tetravalent organic group, and n is an integer of 3 to 7.

The polyimide as described above can be prepared from the corresponding aromatic diamine compound previously described and a dianhydride.

Tetracarboxylic Dianhydride

The tetracarboxylic dianhydride which reacts with the aromatic diamine compound in the preparation of the polyimide of the invention can be represented by the following formula (19).

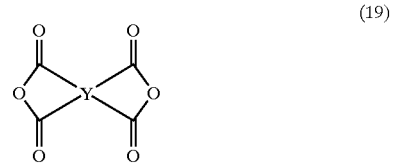

(19)

In the formula (19), Y is a tetravalent organic group and is specifically an aliphatic group, an alicyclic group, a monocyclic aromatic group, a condensed polycyclic aromatic group or a non-condensed cyclic aromatic group wherein aromatic groups are linked to each other directly or through a crosslinking member, each of said groups having 2 to 27 carbon atoms.

The tetracarboxylic dianhydride used herein is not specifically restricted. By the use of hitherto known tetracarboxylic dianhydrides, polyimides having various glass transition temperatures can be obtained.

Examples of the tetracarboxylic dianhydrides used herein include pyromellitic dianhydride, 3-fluoropyromellitic dianhydride, 3,6-difluoropyromellitic dianhydride, 3,6-bis(trifluoromethyl)pyromellitic dianhydride, 1,2,3,4-benzenetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 3,3'',4,4''-terphenyltetracarboxylic dianhydride, 3,3''',4,4'''-quaterphenyltetracarboxylic dianhydride, 3,3'''',4,4''''-quinquephenyltetracarboxylic dianhydride, 2,2',3,3'-biphenyltetracarboxylic dianhydride, methylene-4,4'-diphthalic dianhydride, 1,1-ethynylidene-4,4'-diphthalic dianhydride, 2,2-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, 2,2-bis(3,4-dicarboxyphenyl)-1,1,1,3,3,3-hexafluoropropane dianhydride, difluoromethylene-4,4'-diphthalic dianhydride, 1,1,2,2-tetrafluoro-1,2-ethylene-4,4'-diphthalic dianhydride, 1,1,2,2,3,3-hexafluoro-1,3-trimethylene-4,4'-diphthalic dianhydride, 1,1,2,2,3,3,4,4-octafluoro-1,4-tetramethylene-4,4'-diphthalic dianhydride, 1,1,2,2,3,3,4,4,5,5-decafluoro-1,5-pentamethylene-4,4'-diphthalic dianhydride, oxy-4,4'-diphthalic dianhydride, thio-4,4'-diphthalic dianhydride, sulfonyl-4,4'-diphthalic dianhydride, 1,3-bis(3,4-dicarboxyphenyl)-1,1,3,3-tetramethylsiloxane dianhydride, 1,3-bis(3,4-dicarboxyphenyl)benzene dianhydride, 1,4-bis(3,4-dicarboxyphenyl)benzene dianhydride, 1,3-bis(3,4-dicarboxyphenoxy)benzene dianhydride, 1,4-bis(3,4-dicarboxyphenoxy)benzene dianhydride, 1,3-bis[2-(3,4-dicarboxyphenyl)-2-propyl]benzene dianhydride, 1,4-bis[2-(3,4-dicarboxyphenyl)-2-propyl]benzene dianhydride, bis[3-(3,4-dicarboxyphenoxy)phenyl]methane dianhydride, bis[4-(3,4-dicarboxyphenoxy)phenyl]methane dianhydride, 2,2-bis[3-(3,4-dicarboxyphenoxy)phenyl]propane dianhydride, 2,2-bis[4-(3,4-dicarboxyphenoxy)phenyl]propane dianhydride, 2,2-bis[3-(3,4-dicarboxyphenoxy)phenyl]-1,1,1,3,3,3-hexafluoropropane dianhydride, 2,2-bis[4-(3,4-dicarboxyphenoxy)phenyl]propane dianhydride, bis(3,4-dicarboxyphenoxy)dimethylsilane dianhydride, 1,3-bis(3,4-dicarboxyphenoxy)-1,1,3,3-tetramethyldisiloxane dianhydride, 2,3,6,7-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 1,2,3,4-butanetetracarboxylic dianhydride, 1,2,3,4-cyclobutanetetracarboxylic dianhydride, cyclopentanetetracarboxylic dianhydride, cyclohexane-1,2,3,4-tetracarboxylic dianhydride, cyclohexane-1,2,4,5-tetracarboxylic dianhydride, 3,3',4,4'-bicyclohexyltetracarboxylic dianhydride, carbonyl-4,4'-bis(cyclohexane-1,2-dicarboxylic)dianhydride, methylene-4,4'-bis(cyclohexane-1,2-dicarboxylic)dianhydride, 1,2-ethylene-4,4'-bis(cyclohexane-1,2-dicarboxylic) dianhydride, 1,1-ethynylidene-4,4'-bis(cyclohexane-1,2-dicarboxylic)dicarboxylic) 2,2-propylidene-4,4'-bis(cyclohexane-1,2-dicarboxylic)dianhydride, 1,1,1,3,3,3-hexafluoro-2,2-propylidene-4,4'-bis(cyclohexane-1,2-dicarboxylic)dianhydride, oxy-4,4'-bis(cyclohexane-1,2-dicarboxylic)dianhydride, thio-4,4'-bis(cyclohexane-1,2-dicarboxylic)dianhydride, sulfonyl-4,4'-bis(cyclohexane-1,2-dicarboxylic)dianhydride, 2,2'-difluoro-3,3',4,4'-biphenyltetracarbocylic dianhydride, 5,5'-difluoro-3,3',4,4'-biphenyltetracarboxylic dianhydride, 6,6'-difluoro-3,3',4,4'-biphenyltetracarboxylic dianhydride, 2,2',5,5',6,6'-hexafluoro-3,3',4,4'-biphenyltetracarboxylic dianhydride, 2,2'-bis(trifluoromethyl)-3,3',4,4'-biphenyltetracarboxylic dianhydride, 5,5'-bis(trifluoromethyl)-3,3',4,4'-biphenyltetracarboxylic dianhydride, 6,6'-bis(trifluoromethyl)-3,3',4,4'-biphenyltetracarboxylic dianhydride, 2,2',5,5'-tetrakis(trifluoromethyl)-3,3',4,4'-biphenyltetracarboxylic dianhydride, 2,2',6,6'-tetrakis(trifluoromethyl)-3,3',4,4'-biphenyltetracarboxylic dianhydride, 5,5',6,6'-tetrakis(trifluoromethyl)-3,3',4,4'-biphenyltetracarboxylic dianhydride, 2,2',5,5',6,6'-hexakis(trifluoromethyl)-3,3',4,4'-biphenyltetracarboxylic dianhydride, 3,3'-difluorooxy-4,4'-diphthalic dianhydride, 5,5'-difluorooxy-4,4'-diphthalic dianhydride, 6,6'-difluorooxy-4,4'-diphthalic dianhydride, 3,3',5,5',6,6'-hexafluorooxy-4,4'-diphthalic dianhydride, 3,3'-bis(trifluoromethyl)oxy-4,4'-diphthalic dianhydride, 5,5'-bis(trifluoromethyl)oxy-4,4'-diphthalic dianhydride, 6,6'-bis(trifluoromethyl)oxy-4,4'-diphthalic dianhydride, 3,3',5,5'-tetrakis(trifluoromethyl)oxy-4,4'-diphthalic dianhydride, 3,3',6,6'-tetrakis(trifluoromethyl)oxy-4,4'-diphthalic dianhydride, 5,5',6,6'-tetrakis(trifluoromethyl)oxy-4,4'-diphthalic dianhydride, 3,3',5,5',6,6'-hexakis(trifluoromethyl)oxy-4,4'-diphthalic dianhydride, 3,3'-difluorosulfonyl-4,4'diphthalic dianhydride, 5,5'-difluorosulfonyl-4,4'-diphthalic dianhydride, 6,6'-difluorosulfonyl-4,4'-diphthalic dianhydride, 3,3',5,5',6,6'-hexafluorosulfonyl-4,4'-diphthalic dianhydride, 3,3'-bis(trifluoromethyl)sulfonyl-4,4'-diphthalic dianhydride, 5,5'-bis(trifluoromethyl)sulfonyl-4,4'-diphthalic dianhydride, 6,6'-bis(trifluoromethyl)sulfonyl-4,4'-diphthalic dianhydride, 3,3',5,5'-tetrakis(trifluoromethyl)sulfonyl-4,4'-diphthalic dianhydride, 3,3',6,6'-tetrakis(trifluoromethyl)sulfonyl-4,4'-diphthalic dianhydride, 5,5',6,6'-tetrakis(trifluoromethyl)sulfonyl-4,4'-diphthalic dianhydride, 3,3',5,5',6,6'-hexakis(trifluoromethyl)sulfonyl-4,4'-diphthalic dianhydride, 3,3'-difluoro-2,2-perfluoropropylidene-4,4'-diphthalic dianhydride, 5,5'-difluoro-2,2-perfluoropropylidene-4,4'-diphthalic dianhydride, 6,6'-difluoro-2,2-perfluoropropylidene-4,4'-diphthalic dianhydride, 3,3',5,5',6,6'-hexafluoro-2,2-perfluoropropylidene-4,4'-diphthalic dianhydride, 3,3'-bis(trifluoromethyl)-2,2-perfluoropropylidene-4,4'-diphthalic dianhydride, 5,5'-bis(trifluoromethyl)-2,2-perfluoropropylidene-4,4'-diphthalic dianhydride, 3,3',5,5'-tetrakis(trifluoromethyl)-2,2-perfluoropropylidene-4,4'-diphthalic dianhydride, 3,3',6,6'-tetrakis(trifluoromethyl)-2,2-perfluoropropylidene-4,4'-diphthalic dianhydride, 5,5',6,6'-tetrakis(trifluoromethyl)-2,2-perfluoropropylidene-4,4'-diphthalic dianhydride, 3,3',5,5',6,6'-hexakis(trifluoromethyl)-2,2-perfluoropropylidene-4,4'-diphthalic dianhydride, 9-phenyl-9-(trifluoromethyl)xanthene-2,3,6,7-tetracarboxylic dianhydride, 9,9-bis(trifluoromethyl)xanthene-2,3,6,7-tetracarboxylic dianhydride, bicyclo[2,2,2]oct-7-ene-2,3,5,6-tetracarboxylic dianhydride, 9,9-bis[4-(3,4-dicarboxy)phenyl]fluorene dianhydride and 9,9-bis[4-(2,3-dicarboxy)phenyl]fluorene dianhydride. These tetracarboxylic dianhydrides can be used singly or in combination of two or more kinds.

Of the tetracarboxylic dianhydrides, pyromellitic dianhydride, 3,3',4,4'-benzophenonetetracarboxylic dianhydride, 3,3',4,4'-biphenyltetracarboxylic dianhydride, oxy-4,4'-diphthalic dianhydride, 2,2-bis[4-(3,4-dicarboxyphenoxy)phenyl]propane dianhydride, ethylene glycol bistrimellitic dianhydride, 2,2-bis(3,4-dicarboxyphenyl)-1,1,1,3,3,3-hexafluoropropane dianhydride, etc. are preferably employed.

Other Diamine Compounds

In the polyimide of the invention, the aromatic diamine compound of the invention and other diamine compounds can be used in combination as the diamine components. Thus, the polyimide of the invention includes a polyimide obtained by the reaction of the aforesaid aromatic diamine compound and other diamine compounds with the tetracarboxylic dianhydride. When the polyimide is used as an adhesive, other diamine compounds are employable in combination, within limits not detrimental to the objects of the invention.

Examples of the other diamine compounds include:

1,3-bis(4-(3-aminophenoxy)phenoxy)benzene, 1,3-bis(4-(2-aminophenoxy)phenoxy)benzene, 1,4-bis(3-(3-aminophenoxy)phenoxy)benzene, 1,4-bis(3-(2-aminophenoxy)phenoxy)benzene, 1,4-bis(4-(3-aminophenoxy)phenoxy)benzene, 1,4-bis(4-(2-aminophenoxy)phenoxy)benzene, 1,4-bis(2-(2-aminophenoxy)phenoxy)benzene, 1,4-bis(2-(3-aminophenoxy)phenoxy)benzene, 1,2-bis(4-(3-aminophenoxy)phenoxy)benzene, 1,2-bis(4-(2-aminophenoxy)phenoxy)benzene, 1,3-bis(4-(3-aminophenoxy)phenoxy)-2-ethylbenzene, 1,3-bis(4-(3-aminophenoxy)phenoxy)-2,5-dimethylbenzene, 1,3-bis(4-(2-amino-6-methylphenoxy)phenoxy)benzene, 1,4-bis(3-(3-aminophenoxy)phenoxy)-2,5-di-tert-butylbenzene, 1,4-bis(3-(2-amino-3-propylphenoxy)phenoxy)benzene, 1,3-bis(3-aminophenoxy)benzene, 1,4-bis(3-aminophenoxy)benzene, 1,4-bis(4-aminophenoxy)benzene, 1,2-bis(3-(4-aminophenoxy)phenoxy)benzene, 1,2-bis(4-(4-aminophenoxy)phenoxy)benzene, 1,2-bis(2-(4-aminophenoxy)phenoxy)benzene, 1,3-bis(3-(4-aminophenoxy)phenoxy)benzene, 1,3-bis(2-(4-aminophenoxy)phenoxy)benzene, 1,3-bis[4-(3-aminophenoxy)benzoyl]benzene, 1,4-bis(3-(4aminophenoxy)phenoxy)benzene, 1,4-bis(2-(4-aminophenoxy)phenoxy)benzene, 1,4-bis[4-(3-aminophenoxy)benzoyl]benzene, 1,4-bis(3-(4-aminophenoxy)phenoxy)benzene, 1,3-bis(3-(4-aminophenoxy)phenoxy)-4-methylbenzene, 1,3-bis(2-(4-aminophenoxy)-4-tert-butylphenoxy)benzene, 1,4-bis(3-(4-aminophenoxy)phenoxy)-2,3-dimethylbenzene, 1,2-bis(3-(4-aminophenoxy)phenoxy)-3-n-butylbenzene, 1,4-bis[4-(4-aminophenoxy)-α,α-dimethylbenzyl]benzene, 1,3-bis[4-(4-aminophenoxy)-α,α-dimethylbenzyl]benzene, m-phenylenediamine, o-phenylenediamine, p-phenylenediamine, m-aminobenzylamine, p-aminobenzylamine, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, 4,4'-diaminodiphenyl ether, 3,3'-diaminodiphenyl ether, 3,4'-diaminodiphenyl ether, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3aminophenoxy)phenyl]butane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane, bis(2-(2-aminophenoxy)phenyl)ether, bis(2-(3-aminophenoxy)phenyl) ether, bis(2-(4-aminophenoxy)phenyl) ether, bis(3-(2-aminophenoxy)phenyl)ether, bis(3-(3-aminophenoxy)phenyl) ether, bis(3-(4-aminophenoxy)phenyl) ether, bis(4-(2-aminophenoxy)phenyl)ether, bis(4-(3-aminophenoxy)phenyl)ether, 2-(3-(2-(2-aminophenoxy)phenoxy)phenoxy)aniline, 3-(3-(2-(3-aminophenoxy)phenoxy)phenoxy)aniline, 4-(3-(2-(4-aminophenoxy)phenoxy)phenoxy)aniline, 2-(4-(2-(2-aminophenoxy)phenoxy)phenoxy)aniline, 3-(4-(2-(3-aminophenoxy)phenoxy)phenoxy)aniline, 4-(4-(2-(4-aminophenoxy)phenoxy)phenoxy)aniline, 2-(4-(3-(2-aminophenoxy)phenoxy)phenoxy)aniline, 3-(4-(3-(3-aminophenoxy)phenoxy)phenoxy)aniline, 4-(4-(3-(4-aminophenoxy)phenoxy)phenoxy)aniline, bis(3-(3-aminophenoxy)-4-methylphenyl)ether, bis(3(3-aminophenoxy)-2-isobutylphenyl)ether, bis(3-(2-amino-3-methylphenoxy)phenyl)ether, bis(2-(3-amino-2-methylphenoxy)phenyl)ether, bis(3-(3-amino-2-methylphenoxy)-5-phenylphenyl)ether, bis[4-(3-aminophenoxy)phenyl]ether, bis[4-(4-aminophenoxy)phenyl]ether, 4,4'-bis[3-(4-aminophenoxy)benzoyl]diphenyl ether,
4,4'-bis[3-(3-aminophenoxy)benzoyl]diphenyl ether,
4,4'-bis[4-(4-amino-α,α-dimethylbenzyl)phenoxy] benzophenone,
4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis(3-aminophenyl) sulfide, (3-aminophenyl)(4-aminophenyl) sulfide, bis(4-aminophenyl)sulfide, bis[4-(3-aminophenoxy)phenyl]sulfoxide, bis[4-(aminophenoxy)phenyl]sulfoxide, bis(3-aminophenyl) sulfoxide, (3-aminophenyl)(4-aminophenyl)sulfoxide, bis[4-(3-aminophenoxy)phenyl]sulfone, bis[4-(4-aminophenoxy)phenyl]sulfone, bis(3-aminophenyl)sulfone, (3-aminophenyl)(4-aminophenyl)sulfone, bis(4-aminophenyl)sulfone, 4,4'-bis[4-(4-amino-α,α-dimethylbenzyl)phenoxy] diphenyl sulfone, bis[4-{4-(4-aminophenoxy) phenoxy}phenyl]sulfone, bis(3-aminopropyl)tetramethyldisiloxane, bis(10-aminodecamethylene)tetramethyldisiloxane, and bis(3-aminophenoxymethyl)tetramethyldisiloxane.

The other diamine compounds can be used singly or in combination of two or more kinds.

When the above-mentioned other diamine compounds are used, they are used in amounts of usually 0.01 to 99% by mole, preferably 0.1 to 50% by mole, per 100% by mole of all the diamine compounds used. By the use of the other diamine compounds in such amounts, the glass transition temperature (Tg) of the polyimide of the invention can be controlled.

Polyimde End-capping Agent

In the preparation of the polyimide of the invention, by slightly shifting the amounts of the diamine compound and the tetracarboxylic dianhydride introduced into the reaction system from their theoretical equivalents, the molecular weight of the resulting polyimide can be controlled. In this case, it is preferable to allow the molecular ends to react with a dicarboxylic anhydride or a monoamine to cap the ends of the polyimide for the purpose of inactivating excess amino groups or anhydride groups.

Examples of the dicarboxylic anhydrides used for capping the ends of the polyimide include phthalic anhydride, 2,3-benzophenonedicarboxylic anhydride, 3,4-benzophenonedicarboxylic anhydride, 2,3-dicarboxyphenylphenyl ether anhydride, 2,3-biphenyldicarboxylic anhydride, 3,4-biphenyldicarboxylic anhydride, 2,3-dicarboxyphenylphenyl sulfone anhydride, 3,4-dicarboxyphenylphenyl sulfone anhydride, 2,3-dicarboxyphenylphenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride. These dicarboxylic anhydrides may have a group unreactive to the amine or the dicarboxylic anhydride in the molecule.

Examples of the monoamines include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-nitroaniline, o-bromoaniline, m-bromoaniline, m-nitroaniline, p-nitroaniline, o-aminophenol, m-aminophenol, p-aminophenol, o-anilidine, m-anilidine, p-anilidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenolphenyl ether, 3-aminophenolphenyl ether, 4-aminophenolphenyl ether, 2-aminobenzophenone, 3-aminobenzophenone, 4-aminobenzophenone, 2-aminophenolphenyl sulfide, 3-aminophenolphenyl sulfide, 4-aminophenolphenyl sulfide, 2-aminophenolphenyl sulfone, 3-aminophenolphenyl sulfone, 4-aminophenolphenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 6-amino-1-naphthol, 7-amino-2-naphthol, 8-amino-2-naphthol, 1-aminoanthracene, 2-aminoanthracene and 9-aminoanthracene. These monoamines may have a group unreactive to the amine or the dicarboxylic anhydide in the molecule.

Reaction Process

In the present invention, the aromatic diamine compound, the tetracarboxylic dianhydride, and the dicarboxylic anhydride and/or the monoamine that is used to cap the ends of the resulting polyimide are added and reacted by, for example, the following processes: (A) after the reaction of the tetracarboxylic dianhydride with the diamine, the dicarboxylic anhydride or the monoamine is added to further continue the reaction; (B) the dicarboxylic anhydride is added to the diamine to perform reaction, and then the tetracarboxylic dianhydride is added to further continue the reaction; (C) the mionoamine is added to the tetracarboxylic dianhydride to perform reaction, and then the diamine is added to further continue the reaction; and (D) the tetracarboxylic dianhydride, the diamine, and the dicarboxylic anhydride or the monoamine are added at the same time to perform reaction.

Reaction Solvent

It is preferable to carry out the reaction in an organic solvent. Examples of the solvents used for the reaction include N,N-dimethylformamide, N,N-dimethylacetamide, N-methyl-2-pyrrolidone, 1,2-dimethylethane, N-cyclohexyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(methoxyethoxy)ethyl]ether, tetrahydrofuran, 1,3-dioxane, 1,4-dioxane, pyridine, picoline, dimethyl sulfoxide, dimethyl sulfone, tetramethyl urea, hexamethylphosphoric amide, cyclohexanone, cyclopentanone, phenol, cresol, chlorophenol, anisole, benzene, toluene and xylene.

The concentration of the starting materials in the reaction solution using the organic solvent is in the range of usually 2 to 50% by weight, preferably 5 to 30% by weight.

Reaction Conditions

In the reaction using the organic solvent, the reaction temperature is preferably not higher than 60° C., more preferably not higher than 50° C. The reaction pressure is not specifically restricted, and the reaction smoothly proceeds at atmospheric pressure. Although the reaction time varies depending upon the type of the reaction solvent and the reaction temperature, it is preferably in the range of about 0.5 to 24 hours under the above reaction conditions.

When the reaction is carried out under the above reaction conditions, a polyamic acid that is a precursor of the polyimide of the invention is formed. By heating the polyamic acid to a temperature of preferably 100 to 400° C., imidization of the polyamic acid can be conducted. Also by imidization of the polyamic acid using an imidization agent such as acetic anhydride, a polyimide having a repeating unit corresponding to the polyamic acid can be obtained.

Other than the process for preparing the polyimide through the polyamic acid, a process of reacting the aromatic diamine compound with the tetracarboxylic dianhydride at a temperature of preferably 130 to 250° C. is available. By this process, formation of the polyamic acid and its thermal imidization reaction can be conducted at the same time, and the polyimide of the invention can be prepared in one stage. That is to say, the aromatic diamine compound and the tetracarboxylic dianhydride, and optionally, the monoamine compound and/or the dicarboxylic anhydride that is used to inactivate the polyimide ends are suspended or dissolved in an organic solvent, and they are reacted with heating at a temperature of preferably 130 to 250° C., whereby formation of polyamic acid and dehydration imidization of the polyamic acid proceed at the same time, and as a result, the polyimide of the invention is produced.

Molecular Weight of Polyimide

The molecular weight of the polyimide is not specifically restricted, and the molecular weight can be arbitrarily specified according to the use application or the processing method. For example, the inherent viscosity, which is measured at 35° C. after dissolving the polyamic acid that is a precursor of the polyimide of the invention in N,N- dimethylacetamide in a concentration of 5 0.5 g/dl, can be arbitrarily adjusted in the range of 0.1 to 3.0 dl/g by controlling the quantity ratio among the diamine, the tetracarboxylic dianhydride, and the monoamine and/or the dicarboxylic anhydride. Further, the inherent viscosity, which is measured at 35° C. after dissolving the polyimide of the invention in a mixed solvent of 9 parts by weight of p-chlorophenol and 1 part by weight of phenol under heating in a concentration of 0.5 g/dl, can be arbitrarily adjusted in the range of 0.1 to 3.0 dl/g.

The polyimide of the invention is thermoplastic and has a glass transition temperature (Tg) though it has extremely high heat resistance. The glass transition temperature (Tg) of the polyimide of the invention is usually not higher than 160° C., preferably 30 to 150° C. Accordingly, when the polyimide of the invention is heated, it is softened without being decomposed, and the thus softened polyimide exhibits excellent adhesion properties. In order to adjust the glass transition temperature (Tg) of the polyimide to the above value, the type of the tetracarboxylic dianhydride becomes a very important factor as well as the aromatic diamine compound that is a starting material.

Addition of Other Resins

To the polyimide of the invention, other resins can be added within limits not detrimental to the objects of the invention. Examples of such resins include polyethylene, polypropylene, polycarbonate, polyacrylate, polyamide, polysulfone, polyether sulfone, polyether ketone, polyether ether ketone, polyphenylene sulfide, modified polyphenylene oxide, polyamide imide, polyether imide, bismaleimide and epoxy resin.

EXAMPLE

The present invention is further described with reference to the following examples, but it should be construed that the invention is in no way limited to those examples.

Measurements of Polyimide Property Values

The properties of the polyimides in the following examples and comparative examples were measured by the methods described below.
Inherent Viscosity of Polyamic Acid
The polyamic acid to be measured was dissolved in N,N-dimethylacetamide in a concentration of 0.5 g/dl, and the inherent viscosity was measured at 35° C.
Glass Transition Temperature (Tg)
The glass transition temperature was measured by a differential scanning calorimeter (DSC3110, manufactured by Mac Science K.K.).
90°-Peel Adhesive Strength
The 90°-peel adhesive strength was measured in accordance with IPC-TM-650 Method 2,4,9.

Example 1

Synthesis of 1,3-bis(3-fluorophenoxy)benzene

In a nitrogen atmosphere, 76.4 g (0.693 mole) of resorcinol, 382 g (3.34 mole) of m-difluorobenzene, 500 g (3.62 mole) of potassium carbonate and 1 liter of 1,3-dimethyl-2-imidazolidinone (abbreviated to DMI hereinafter) were placed in a 3-liter SUS autoclave, and the autoclave was closed. Then, the reaction vessel was purged with nitrogen, and the internal temperature was raised up to 220° C. with stirring. The contents in the reaction vessel were stirred for 20 hours under heating at 220° C. During the stirring, the internal pressure was not more than 0.7 MPa. The progress of the reaction was confirmed by high performance liquid chromatography (HPLC). The intermediate product, 3-(3fluorophenoxy)phenol almost disappeared at this time. After cooling to room temperature, the reaction mixture was filtered to separate a salt. To the resulting filtrate, 1 liter of toluene and 2 liters of water were added. Then, liquid separation was carried out to obtain an organic phase. The organic phase was washed with 1 liter of a 5% sodium hydroxide aqueous solution and then washed with 1 liter of water. The solvent and the starting difluorobenzene were distilled off under reduced pressure, and then quantitative determination was made by HPLC. As a result, the reaction yield of 1,3-bis(3-fluorophenoxy)benzene was 63%. The resulting crude compound was purified by vacuum distillation (bp 190° C./6.5 hPa) to obtain 109 g (0.365 mole, purity (HPLC): 99%, yield: 53%) of 1,3-bis(3-fluorophenoxy)benzene as a colorless oily product. The structure and the properties of the compound are as follows.

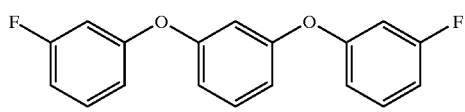

$^1$H-NMR(CD$_3$SOCD$_3$) δ: 6.74–7.04 (m, 9H), 7.39–7.47 (m, 3H) FD-mass 298(M$^+$)

Example 2

Synthesis of 1,3-bis(3-(3-aminophenoxy)phenoxy)benzene

In a nitrogen atmosphere, 742 g (6.8 mole) of m-aminophenol, 1025 g (7.42 mole) of potassium carbonate and 340 g (1.14 mole) of 1,3-bis(3-fluorophenoxy)benzene were added to 4.64 liters of DMI, and they were stirred for 50 hours under heating at 210 to 215° C. The progress of the reaction was confirmed by high performance liquid chromatography (HPLC). When the intermediate product, 3-(3-aminophenoxy)phenyl-3-(3-fluorophenoxy)phenyl ether almost disappeared, the reaction was terminated. After cooling to room temperature, the reaction mixture was filtered to separate a salt. To the resulting filtrate, 3 liters of toluene and 6 liters of water were added, and liquid separation was carried out to obtain an organic phase. The organic phase was washed twice with 6 liters of a 1% sodium hydroxide aqueous solution and then washed twice with 6 liters of water. After an organic phase was obtained by liquid separation, 180 g of anhydrous magnesium sulfate was added to the organic phase to perform dehydration. Magnesium sulfate was then separated by filtration. To the resulting solution, 1.2 liters of methanol and 225 g of a 37% hydrochloric acid aqueous solution were added, followed by stirring at room temperature.

From the solution, methanol was distilled off under reduced pressure, whereby a hydrochloric acid salt of 1,3-bis(3-(3-aminophenoxy)phenoxy)benzene was precipitated in toluene as a white crystal. The resulting crude hydrochloric acid salt was separated by filtration, washed with 3 liters of toluene and added to a mixed solvent of 4.8 liters of ethyl acetate and 1.2 liters of isopropanol, followed by stirring at room temperature for 30 minutes. The hydrochloric acid salt was separated by filtration, washed with 3 liters of ethyl acetate and added to a mixture of 6 liters of a 5% sodium hydroxide aqueous solution and 6 liters of ethyl acetate.

After stirring, an organic phase was obtained by liquid separation. To the organic phase, 180 g of anhydrous magnesium sulfate was added to perform dehydration, and then magnesium sulfate was separated by filtration. The solvent was distilled off under reduced pressure, and then the residue was vacuum dried to obtain 510 g (1.02 mole, purity (HPLC): 97.8%, yield: 90%) of 1,3-bis(3-(3-aminophenoxy)phenoxy)benzene as an oily product. The structure and the properties of the compound are as follows.

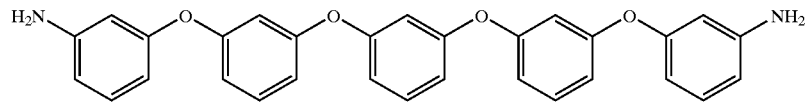

$^1$H-NMR(CD$_3$SOCD$_3$) δ: 5.24 (s, 4H), 6.12–6.16 (ddd, 2H, J=7.83, 2,43, 0.82 Hz), 6.23 (t, 2H, J=2.30 Hz), 6.33–6.37 (ddd, 2H, J=7.83, 2,43, 0.82 Hz), 6.61 (t, 2H, J=2.43 Hz), 6.67 (t, 1H, J=2.43 Hz), 6.71–6.80 (m, 6H), 6.99 (t, 2H, J=7.83 Hz), 7.35 (t, 2H, J=7.83 Hz), 7.38 (t, 1H, J=7.83 Hz) FD-mass 476(M$^+$)

Example 3

Synthesis of 1,3-bis(3-(3-fluorophenoxy)phenoxy) benzene

In a nitrogen atmosphere, 1 g (9 mmole) of resorcinol was suspended in 20 ml of DMI, and 2 g (15 mmole) of potassium carbonate was added, followed by stirring for 30 minutes. To the suspension, 5 g (45 mmole) of m-difluorobenzene was added. The resulting suspension was transferred into an autoclave and stirred for 20 hours at 0.6 MPa under heating at 220° C. Then, liquid separation was carried out to obtain an organic phase, and the solvent and the starting difluorobenzene were distilled off under reduced pressure. The residue was purified by column chromatography to obtain 0.34 g (0.72 mmole, yield: 8%, purity (HPLC): 97%) of 1,3-bis(3-(3-fluorophenoxy)phenoxy)benzene as a colorless oily product. The structure and the properties of the compound are as follows.

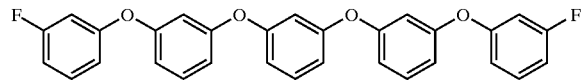

$^1$H-NMR(CD$_3$SOCD$_3$) δ: 6.72–7.01 (m, 15H), 7.38–7.46 (m, 5H) FD-mass 482(M$^+$)

Example 4

Synthesis of 1,3-bis(3-(3-(3-aminophenoxy) phenoxy)phenoxy)benzene

In a nitrogen atmosphere, 1 g (9 mmole) of maminophenol was dissolved in 20 ml of DMI, and 2 g (15 mmole) of potassium carbonate was added, followed by stirring for 30 minutes. Then, 1 g (2 mmole) of 1,3-bis(3-(3-fluorophenoxy)phenoxy)benzene was added, and the mixture was stirred for 14 hours under heating at 210° C. The progress of the reaction was confirmed by HPLC. When the intermediate product, 3-(3-(3-aminophenoxy)phenoxy)phenyl-3-(3-(3-fluorophenoxy)phenoxy)phenyl ether almost disappeared, the reaction was terminated. Then, liquid separation was carried out in the same manner as in Example 2 to obtain an organic phase, and the solvent was distilled off under reduced pressure. The residue was purified by column chromatography to obtain 1.1 g (1.6 mmole, yield: 86%, purity (HPLC): 98%) of 1,3-bis(3-(3-(3-aminophenoxy)phenoxy)phenoxy)benzene as a yellow oily product. The structure and the properties of the compound are as follows.

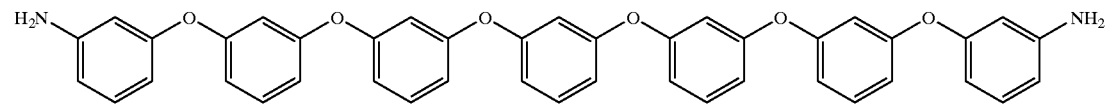

$^1$H-NMR(CD$_3$SOCD$_3$) δ: 5.21 (s, 4H), 6.11–6.12 (ddd, 2H, J=7.83, 2.16, 0.81 Hz), 6.21 (t, 2H, J=2.16 Hz), 6.31–6.36 (ddd, 2H, J=7.83, 2.16, 0.81 Hz), 6.60 (t, 2H, J=2.16Hz), 6.67–6.82 (m, 13H), 6.98 (t, 2H, J=8.10 Hz), 7.31–7.42 (m, 5H) FD-mass 660(M$^+$)

Example 5

In a three-neck flask fitted with a mechanical stirrer, thermometer and nitrogen inlet tube, 9.530 g (0.020 mole) of 1,3-bis(3-(3-aminophenoxy)phenoxy)benzene (the compound of Example 2) and 56.699 g (0.020 mole) of N,N-dimethylacetamide were placed, and they were stirred for 30 minutes in a nitrogen atmosphere.

Thereafter, to the solution was added 4.144 g (0.019 mole) of pyromellitic dianhydride by portions with giving attention to the increase of the solution temperature, and they were stirred for 24 hours at room temperature to prepare polyamic acid.

The resulting polyamic acid had an inherent viscosity of 0.46 dl/g.

A part of the polyamic acid was withdrawn, cast on a glass plate and then heated to 270° C. from 50° C. at a heating rate of 7° C./min to obtain a film having a thickness of 10 μm. The resulting polyimide film had a glass transition temperature (Tg) of 160° C.

In order to confirm the low-temperature adherability of polyimide, the resulting polyamic acid was cast on KAPTON™ 200EN (polyimide available from Toray duPont K.K., thickness: 50 μm) and heated to 270° C. from 50° C. at a heating rate of 7° C./min to obtain an adhesive tape having a total thickness of 60 μm.

The adhesive tape was press bonded to a copper foil (SLP-18 available from Nippon Denkai K.K.) by means of a pulse bonder (TC-1320UD manufactured by Kel K.K.) under the conditions of 200° C., 3 MPa and 8 seconds.

The resulting test specimen was subjected to a 90°-peel test in accordance with IPC-TM-650 Method 2,4,9. As a result, the peel adhesive strength was 1.94 kN/m.

The results are set forth in Table 1.

Examples 6–9

Polyamic acid was prepared in the same manner as in Example 5, except that various tetracarboxylic dianhydrides shown in Table 1 were each used instead of pyromellitic dianhydride. Then, the inherent viscosity of the polyamic acid was measured.

From the polyamic acid, polyimide was prepared in the same manner as in Example 5. The polyimide was measured on the glass transition temperature (Tg) and the peel adhesive strength in the same manner as in Example 5.

The results are set forth in Table 1.

Example 10

In a three-neck flask fitted with a mechanical stirrer, thermometer and nitrogen inlet tube, 9.530 g (0.020 mole) of 1,3-bis(3-(3-aminophenoxy)phenoxy)benzene and 61.667 g of N,N-dimethylacetamide were charged, and they were stirred for 30 minutes in a nitrogen atmosphere.

Thereafter, to the solution was added 5.590 g (0.019 mole) of 3,3',4,4'-biphenyltetracarboxylic dianhydride by portions with giving attention to the increase of the solution temperature, and they were stirred for 24 hours at room temperature.

To the solution was added 0.296 g (0.002 mole) of phthalic anhydride, and they were stirred for 4 hours to prepare polyamic acid.

The polyamic acid thus obtained had an inherent viscosity of 0.45 dl/g.

The polyamic acid was subjected to thermal imidization in the same manner as in Example 5.

The resulting polyimide had a glass transition temperature (Tg) of 155° C.

Further, an adhesive tape was prepared in the same manner as previously described, and the peel adhesive strength of the adhesive tape was measured. As a result, the peel adhesive strength was 2.24 kN/m.

The results are set forth in Table 1.

Example 11

Polyamic acid was prepared in the same manner as in Example 10, except that 2,2-bis[4-(3,4-dicarboxyphenoxy)phenyl]propane dianhydride was used instead of 3,3',4,4'-biphenyltetracarboxylic dianhydride. Then, the inherent viscosity of the polyamic acid was measured.

Using the polyamic acid, polyimide was prepared, and the polyimide was measured on the glass transition temperature (Tg) and the peel adhesive strength.

The results are set forth in Table 1.

Example 12

Polyamic acid was prepared in the same manner as in Example 5, except that 1,3-bis(3-(3-(3-aminohenoxy)phenoxy)phenoxy)benzene (the compound of Example 4) was used as the diamine compound and 3,3',4,4'-benzophenonetetracarboxylic dianhydride was used as the dianhydride. Then, the inherent viscosity of the polyamic acid was measured.

Using the polyamic acid, polyimide was prepared, and the polyimide was measured on the glass transition temperature (Tg) and the peel adhesive strength.

The results are set forth in Table 1.

Comparative Examples 1–5

Polyamic acid was prepared in the same manner as in Example 5, except that 1,3-bis(3-aminophenoxy)benzene was used instead of 1,3-bis(3-(3-aminophenoxy)phenoxy)benzene and the compound shown in Table 1 was used as the dianhydride. Using the polyamic acid, polyimide was prepared.

The inherent viscosity of the polyamic acid and the glass transition temperature (Tg) and the peel adhesive strength of the polyimide were measured in the same manner as in Example 5.

The results are set forth in Table 1.

As shown in Table 1, there were polyimides whose peel adhesive strength could not be effectively measured (peel adhesive strength: 0 kN/m). Further, even in the case of the polyimides exhibiting adhesive strength, the peel adhesive strength was not more than 1 kN/m and was low.

TABLE 1

| Unit | Diamine*[1] mole | Dianhydride*[2] mole | | Inherent viscosity of polyamic acid dl/g | Tg of Polyimide ° C. | Peel adhesive strength kN/m |
|---|---|---|---|---|---|---|
| Ex. 5 | APB5 (0.020) | PMDA (0.019) | | 0.46 | 160 | 1.94 |
| Ex. 6 | APB5 (0.020) | BPDA (0.019) | | 0.49 | 156 | 2.29 |
| Ex. 7 | APB5 (0.020) | BTDA (0.019) | | 0.50 | 153 | 2.12 |
| Ex. 8 | APB5 (0.020) | ODPA (0.0190) | | 0.44 | 136 | 2.28 |
| Ex. 9 | APB5 (0.020) | BisA-DA (0.019) | | 0.47 | 137 | 2.20 |
| Ex. 10 | APB5 (0.020) | BPDA (0.019) | PA (0.002) | 0.45 | 155 | 2.24 |
| Ex. 11 | APB5 (0.020) | BisA-DA (0.019) | PA (0.002) | 0.45 | 136 | 2.11 |
| Ex. 12 | APB7 (0.020) | BTDA (0.019) | | 0.54 | 137 | 2.13 |
| Comp. Ex. 1 | APB (0.020) | PMDA (0.019) | | 0.45 | 202 | 0 |
| Comp. Ex. 2 | APB (0.020) | BPDA (0.019) | | 0.48 | 191 | 0 |
| Comp. Ex. 3 | APB (0.020) | BTDA (0.019) | | 0.49 | 195 | 0 |
| Comp. Ex. 4 | APB (0.020) | ODPA (0.019) | | 0.43 | 166 | 0.63 |
| Comp. Ex. 5 | APB (0.020) | BisA-DA (0.019) | | 0.46 | 158 | 0.82 |

Remarks:
*[1] APB5: 1,3-bis(3-(3-aminophenoxy)phenoxy)benzene
APB7: 1,3-bis(3-(3-(3-aminophenoxy)phenoxy)phenoxy)benzene
APB: 1,3-bis(3-aminophenoxy)benzene
*[2] PMDA: pyromellitic dianhydride
BPDA: 3,3',4,4'-biphenyltetracarboxylic dianhydride
BTDA: 3,3',4,4'-benzophenonetetracarboxylic dianhydride
ODPA: bis(dicarboxyphenyl) ether dianhydride
BisA-DA: 2,2-bis[4-(3,4-dicarboxyphenoxy)phenyl]propane dianhydride
PA: phthalic anhydride

EFFECT OF THE INVENTION

By the present invention, a novel aromatic diamine compound that is useful as a resin starting material, particularly an adhesive polyimide resin starting material can be provided.

By the present invention, further, a novel aromatic difluoro compound that is useful as a starting material of the aromatic diamine can be provided.

The polyimide obtained from the aromatic diamine of the invention has excellent heat resistance, and besides it exhibits excellent adhesion properties when it is heated at a relatively low temperature.

What is claimed is:

1. An aromatic diamine compound represented by the formula (1):

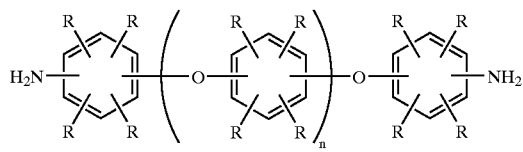

(1)

wherein n is an integer of 3 to 7, each R is independently an atom or a group selected from the group consisting of a hydrogen atom, a halogen atom and a hydrocarbon group, the same or different two hetero atoms selected from nitrogen atoms and oxygen atoms bonded to each benzene ring are at the ortho- or meta-positions to each other on at least one benzene ring, and when n is 3, the hetero atoms are at the ortho- or meta-positions to each other on all the benzene rings.

2. The aromatic diamine compound as claimed in claim 1, wherein R in the formula (1) is a hydrogen atom.

3. The aromatic diamine compound as claimed in claim 1, which is represented by the formula (2):

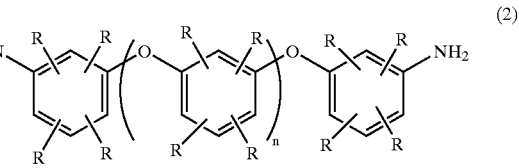

(2)

wherein R and n are as defined in the formula (1).

* * * * *